US008403782B2

(12) United States Patent
Tsao

(10) Patent No.: US 8,403,782 B2
(45) Date of Patent: Mar. 26, 2013

(54) ADJUSTING DEVICE AND PRINTING APPARATUS WITH ADJUSTING DEVICE

(75) Inventor: Yu-Jen Tsao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/295,161

(22) Filed: Nov. 14, 2011

(65) Prior Publication Data

US 2012/0249677 A1 Oct. 4, 2012

(30) Foreign Application Priority Data

Mar. 28, 2011 (TW) ............................ 100110546 A

(51) Int. Cl.
*F16H 7/08* (2006.01)
(52) U.S. Cl. ....................................................... 474/109
(58) Field of Classification Search ........................ None
See application file for complete search history.

(56) References Cited

U.S. PATENT DOCUMENTS 7,247,109 B2 * 7/2007 Youn ............................ 474/109

* cited by examiner

*Primary Examiner* — Matthew Luu
*Assistant Examiner* — Alejandro Valencia
(74) *Attorney, Agent, or Firm* — Altis Law Group, Inc.

(57) ABSTRACT

A printing apparatus comprises a print head moving module comprising a mounting plate, a first wheel, a second wheel, an endless belt, a retaining member of the mounting plate to clamp with the second wheel; an adjusting device comprising a positioning member of the mounting plate, a driving member of the positioning member comprising an indicating block, a moveable member of the positioning member abutting the retaining member, the moveable member comprises a receiving portion having graduations; the indicating block is through the positioning member in the receiving portion; a resilient member in the receiving portion between the driving and the moveable members; wherein the driving member drives the moveable and the retaining members from a first to a second position, in the first position, the indicating block is away from a predetermined graduation; in the second position, resilient member deformed, the indicating block is at the predetermined graduation.

10 Claims, 9 Drawing Sheets

ADJUSTING DEVICE AND PRINTING APPARATUS WITH ADJUSTING DEVICE

BACKGROUND

1. Technical Field

The present disclosure relates to printing apparatuses, more particularly to a printing apparatus with an adjusting device.

2. Description of Related Art

A printer may include a printing module and a print head moving module for driving the printing module across the paper to be printed. A tension of the endless belt may be provided by a spring device. However, the spring device may often have a tolerance and if the endless belt is not at the correct tension, printing quality may be decreased. Therefore, an improved printing apparatus may be desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
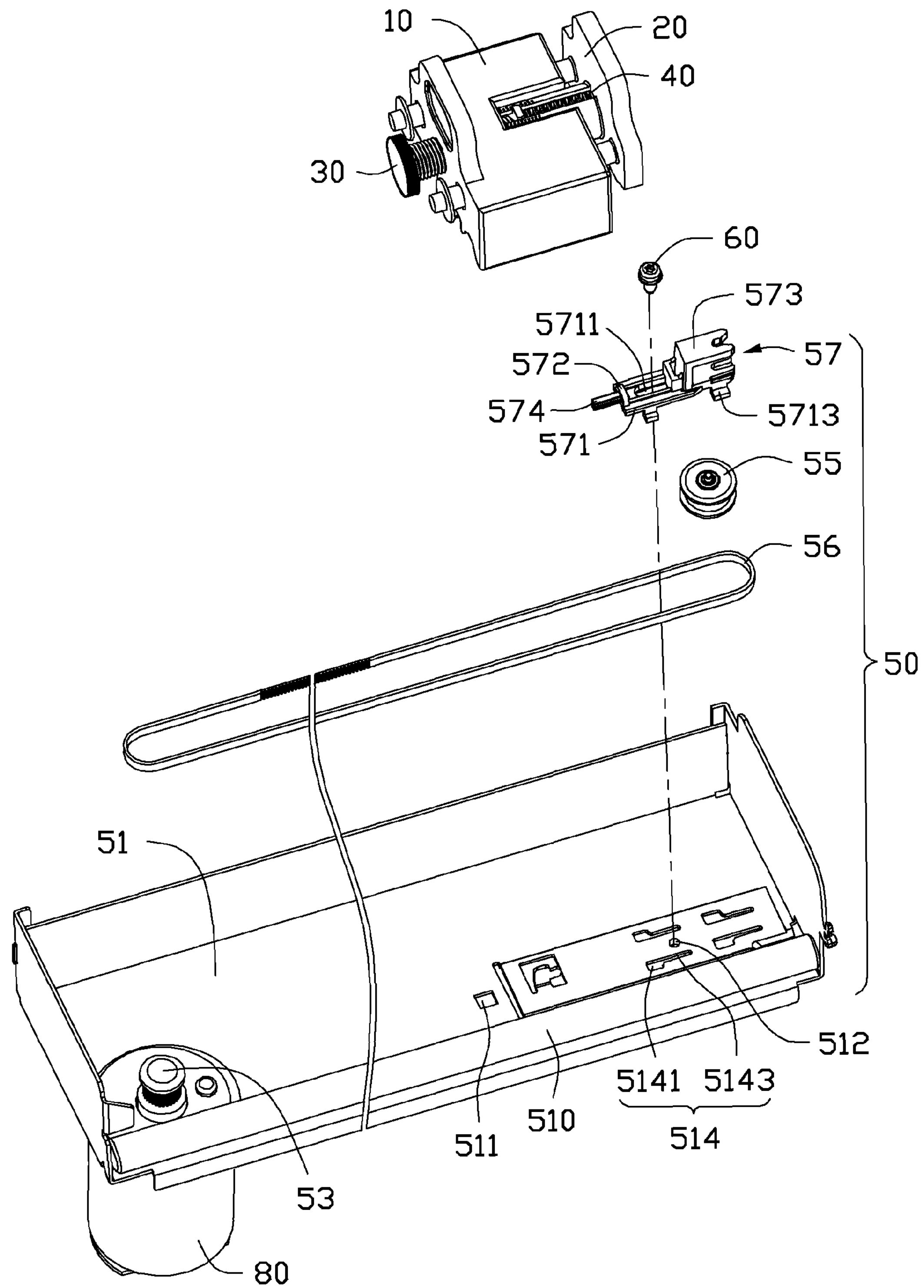
FIG. 1 is an exploded, isometric view of an adjusting device and a print head moving module of a printing apparatus in accordance with an embodiment of the present disclosure.
Figure 2:
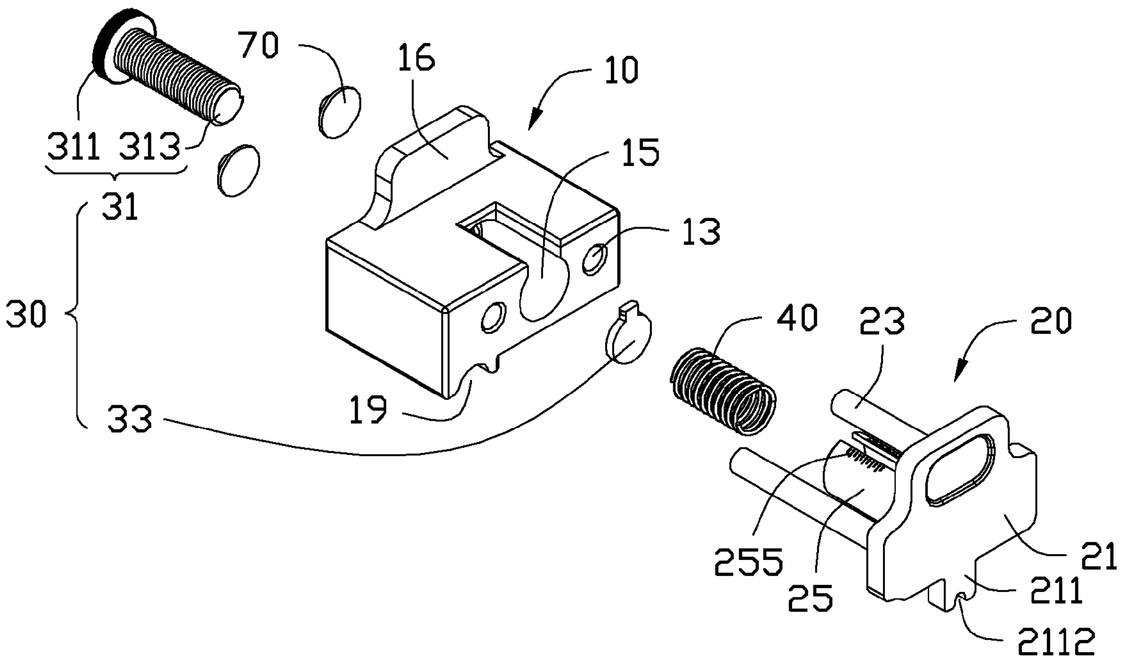
FIG. 2 is an exploded, isometric view of the adjusting device of FIG. 1.
Figure 3:
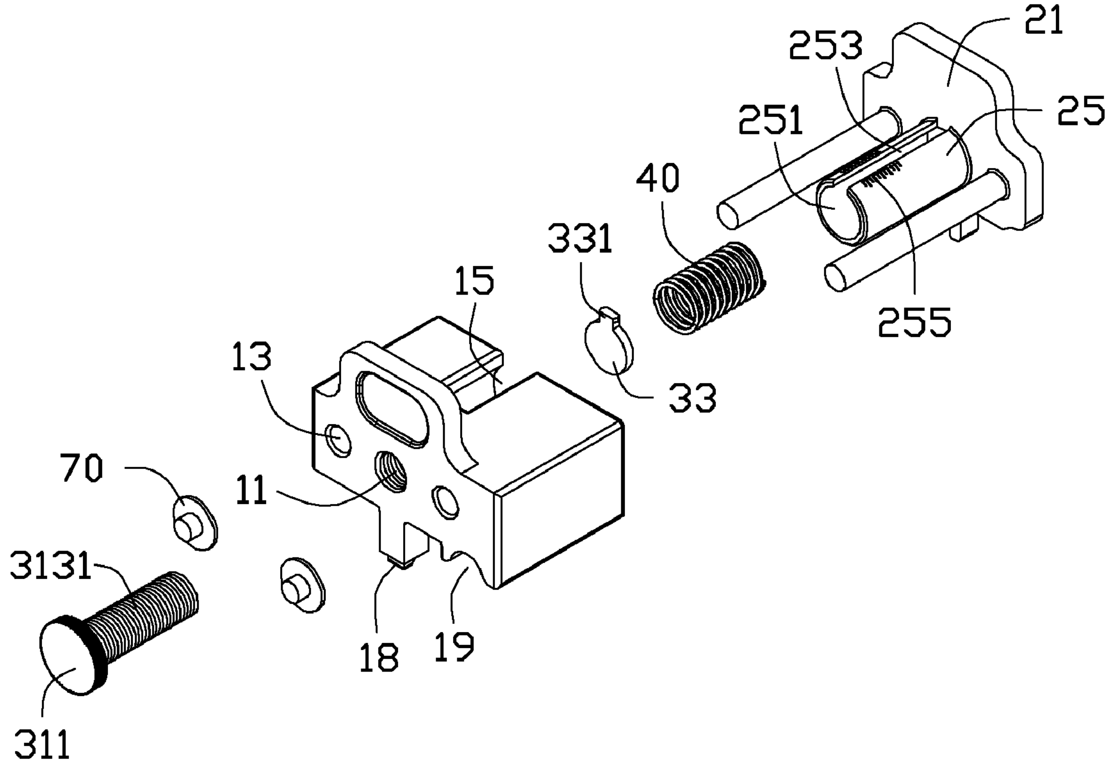
FIG. 3 is similar to FIG. 2, but shown in a different aspect.

Referring to FIGS. 1-3, an adjusting device in accordance with an embodiment comprises a positioning member 10, a moveable member 20, a driving member 30, and a resilient member 40 located between the moveable member 20 and the driving member 30. The moveable member 20 is moveably secured to the positioning member 10, and the driving member 30 is secured to the moveable member 20. In one embodiment, the adjusting device is attached to a print head moving module 50 of a printing, or other moving-head apparatus such as a scanner.

The positioning member 10 defines a threaded hole 11, and two receiving holes 13 wherein each of the two receiving holes 13 is located on each side of the threaded hole 11. An accommodating slot 15 is defined in the positioning member 10 and communicates with the threaded hole 11. An operating portion 16 extends from a top surface of the positioning member 10, and a clipping post 18 extends from a bottom surface, opposite to the top surface of the positioning member 10. The positioning member 10 defines a positioning slot 19 adjacent to the clipping post 18. In one embodiment, the positioning slot 19 is curved.

The moveable member 20 comprises a main body 21, two securing posts 23 extending from a side of the main body 21, and a receiving portion 25 located between the two securing posts 23. A resisting portion 211 extends from a bottom edge of the main body 21 and defines a cutout 2112. The receiving portion 25 defines a positioning hole 251, and a gap 253 communicating with the positioning hole 251. A plurality of graduations 255 are defined in the receiving portion 25, on two opposite sides of the gap 253.

The driving member 30 comprises a driving portion 31, and an indicating block 33 attached to the driving portion 31. The driving portion 31 comprises a head 311, and a driving post 313 connected to the head 311. The driving post 313 has an outer thread 3131. The indicating block 33 comprises an indicating portion 331. In one embodiment, a diameter of the head 311 is greater than a diameter of the threaded hole 11.

The print head moving module 50 comprises a mounting plate 51, a first wheel 53, a second wheel 55, an endless belt 56, and a retaining member 57. The first wheel 53 is mounted to the mounting plate 51, and the endless belt 56 connects the first wheel 53 and the second wheel 55. The mounting plate 51 comprises a positioning pole 510, a clamping hole 511, a securing hole 512, and four sliding slots 514. The four sliding slots 514 are arranged at four corners of a rectangle. Each sliding slot 514 comprises a guiding portion 5141, and a sliding portion 5143 communicating with the guiding portion 5141. The first wheel 53 is mounted to a driver 80, such as a motor.

The retaining member 57 comprises a fixing plate 571, and a clamping plate 573 connected to the fixing plate 571. The fixing plate 571 comprises a fixing hole 5711, and four sliding blocks 5713. The four sliding blocks 5713 are located on opposite edges of the fixing plate 571, and correspond to the four sliding slots 514. An abutting portion 572 and a protruding post 574 are located on a side of the fixing plate 571, furthest from the clamping plate 573.

Figure 4:
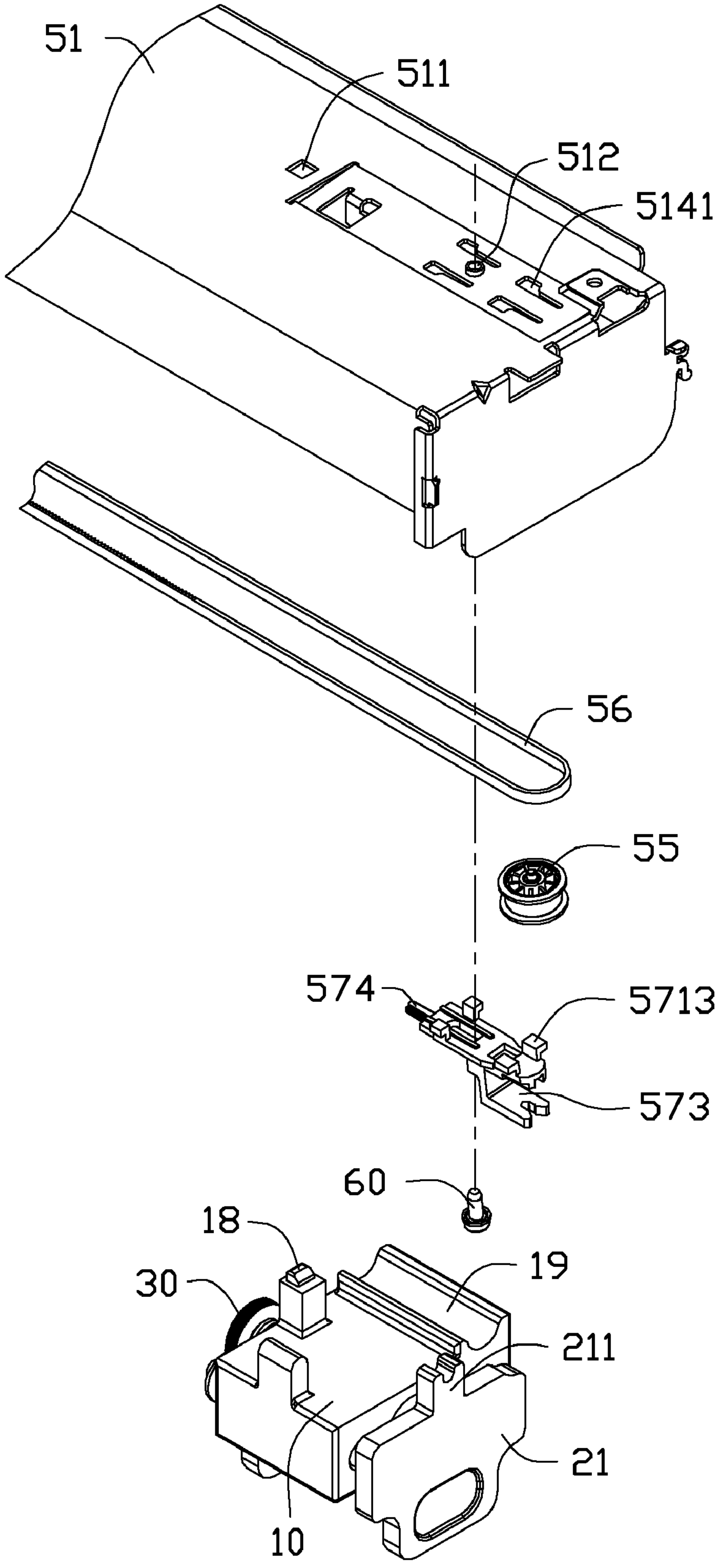
FIG. 4 is similar to FIG. 1, but shown in a different aspect.
Figure 5:
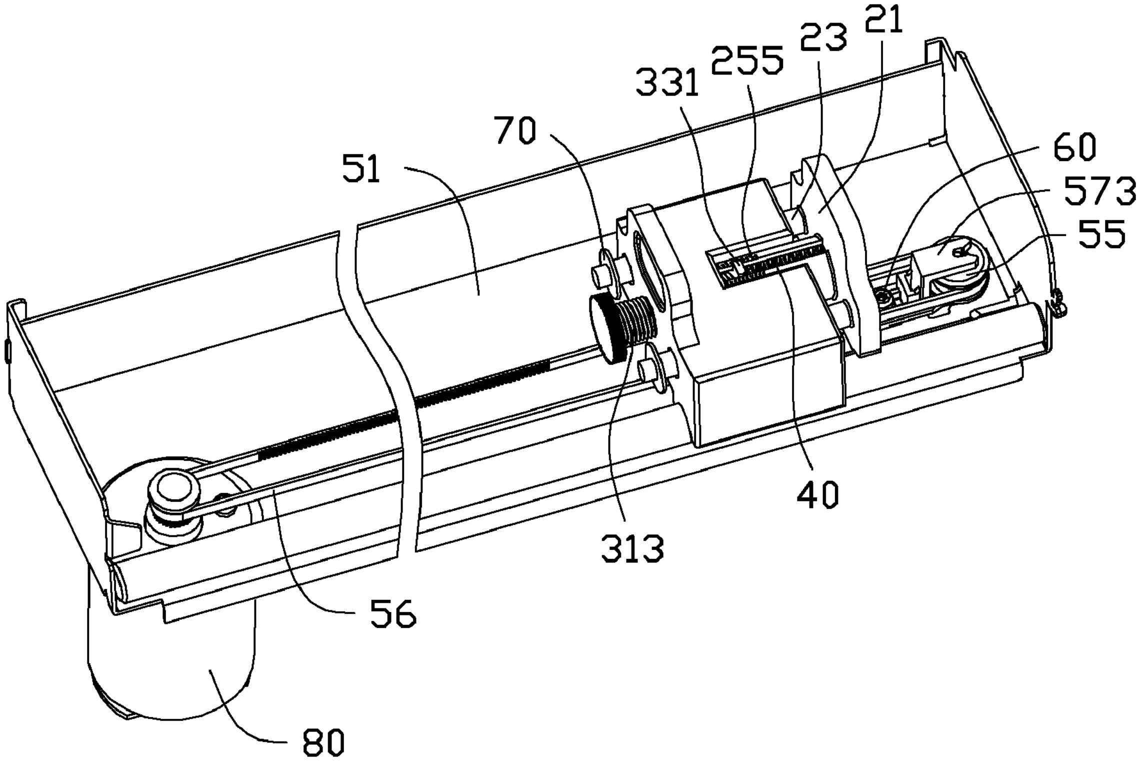
FIG. 5 is an assembled view of the printing apparatus of FIG. 1.
Figure 6:
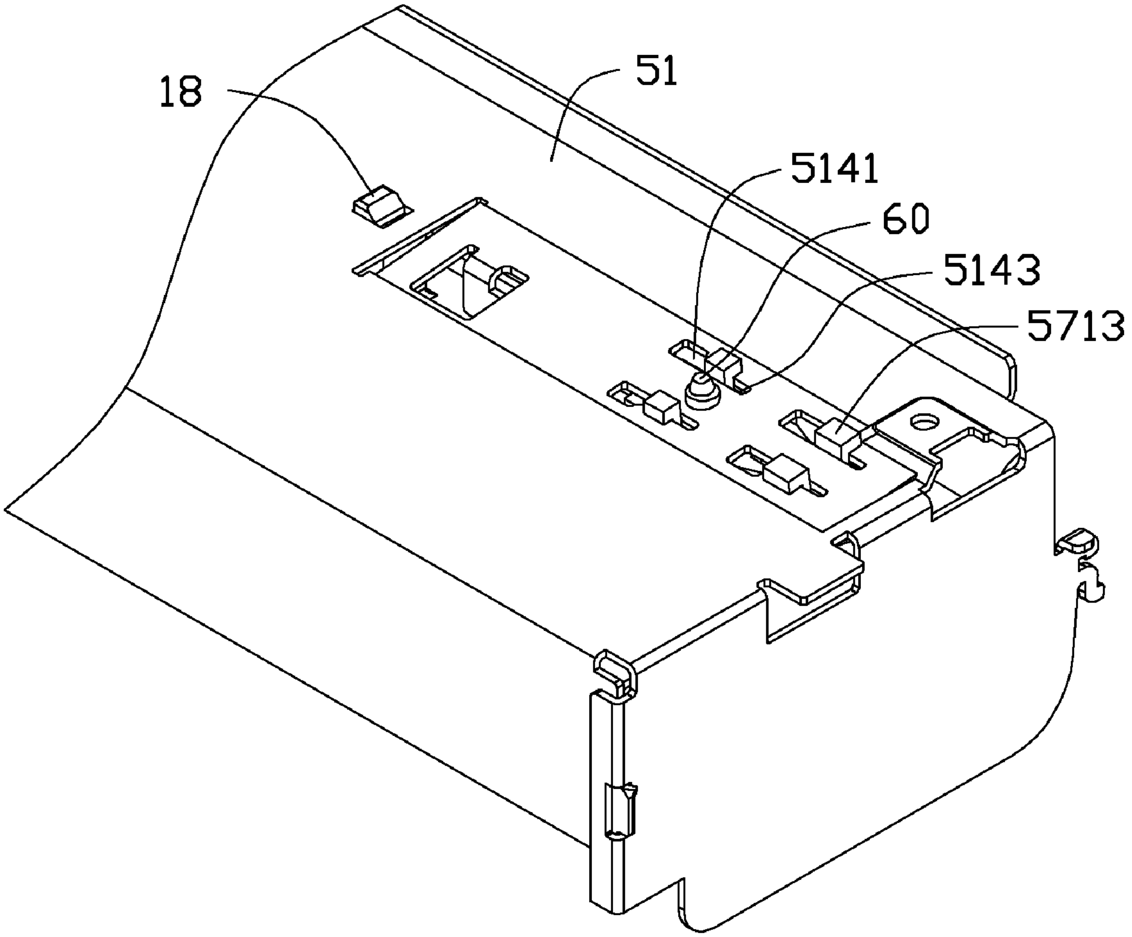
FIG. 6 is an assembled view of the printing apparatus of FIG. 4.
Figure 7:
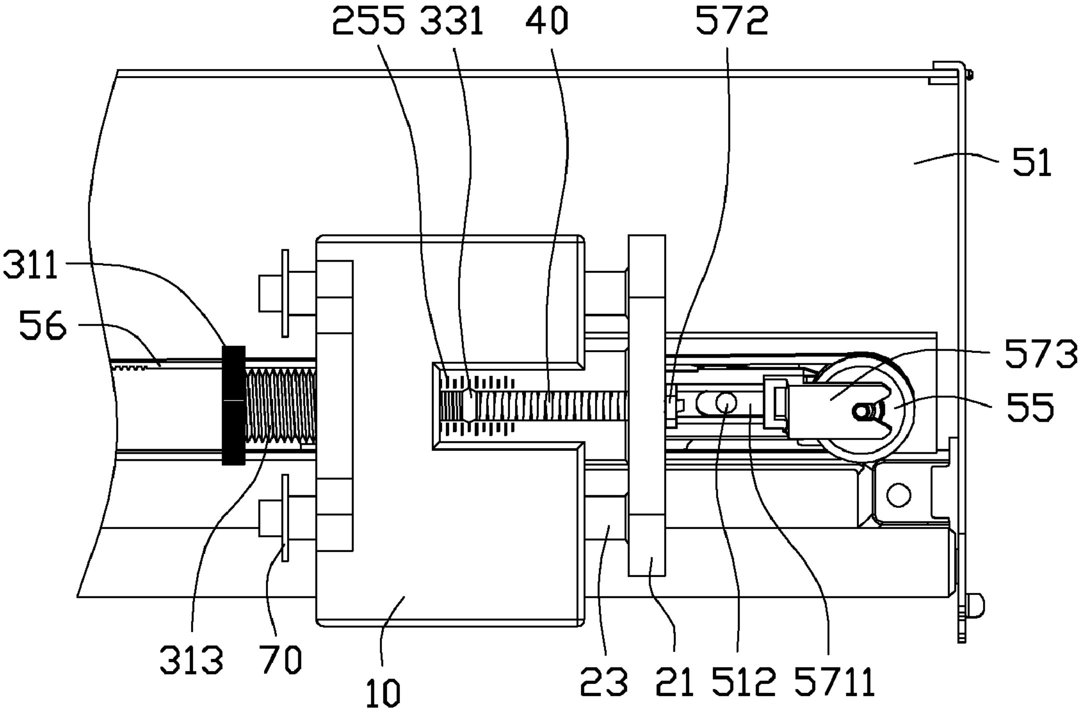
FIG. 7 is a front view of the printing apparatus of FIG. 5, and the adjusting device is in a first position.

Referring to FIG. 4, in assembly, the driving post 313 is received in the threaded hole 11, and the indicating block 33 is secured to the driving post 313. The resilient member 40 is received in the positioning hole 251. Each of the two securing posts 23 is extended through each of the two receiving holes 13. The resilient member 40 abuts the indicating block 33. The indicating portion 331 sticks out of the receiving portion 25 and levels with one or more of the plurality of graduations 255. Each of two securing members 70 is attached to each of the two securing posts 23. The moveable member 20 is secured to the positioning member 10. The adjusting device has been assembled.

Referring FIGS. 5-8, the four sliding blocks 5713 are slid into the corresponding four guiding portions 5141, to slidably secure the retaining member 57 to the mounting plate 51. The second wheel 55 is located between the clamping plate 573 and the fixing plate 571, and the clamping plate 573 clamps the second wheel 55. The endless belt 53 is engaged with the first wheel 53 and the second wheel 55.

The adjusting device is placed on the mounting plate 51. The protruding post 574 extends through the cutout 2112, and the abutting portion 572 abuts the resisting portion 211. The clipping post 18 is engaged in the clamping hole 511, and the positioning slot 19 is engaged with the positioning pole 510. The positioning member 10 is secured to the mounting plate 51.

Figure 8:
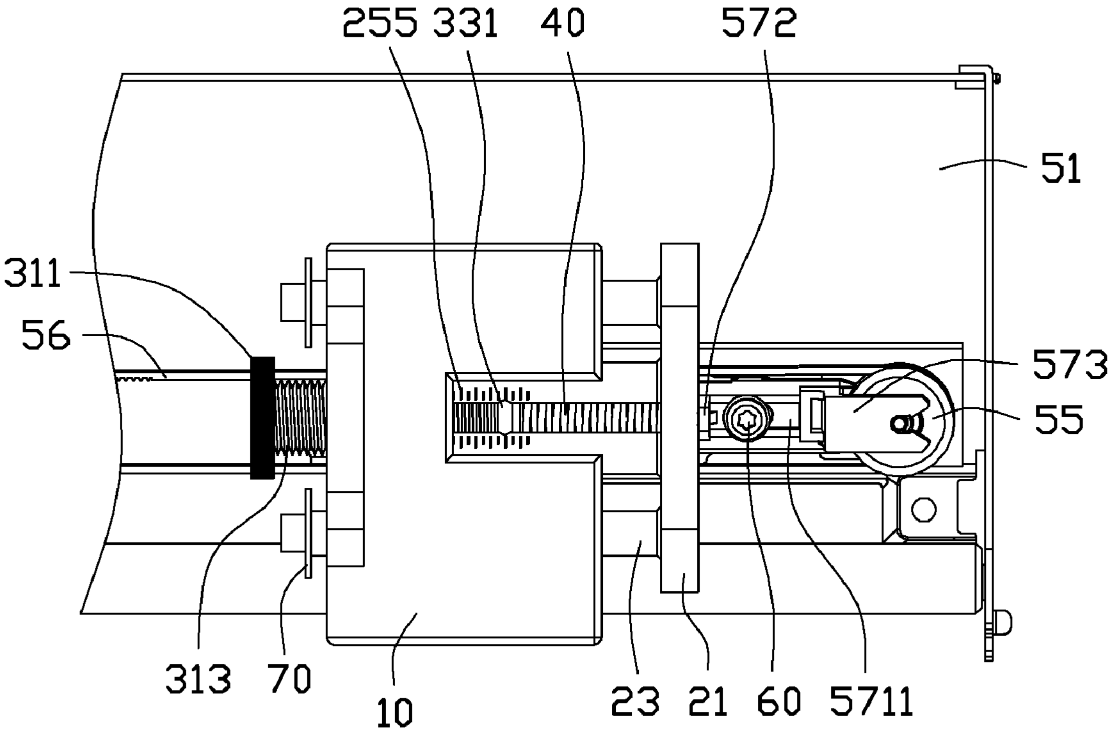
FIG. 8 is similar to FIG. 7, but shows the adjusting device in a second position.
Figure 9:
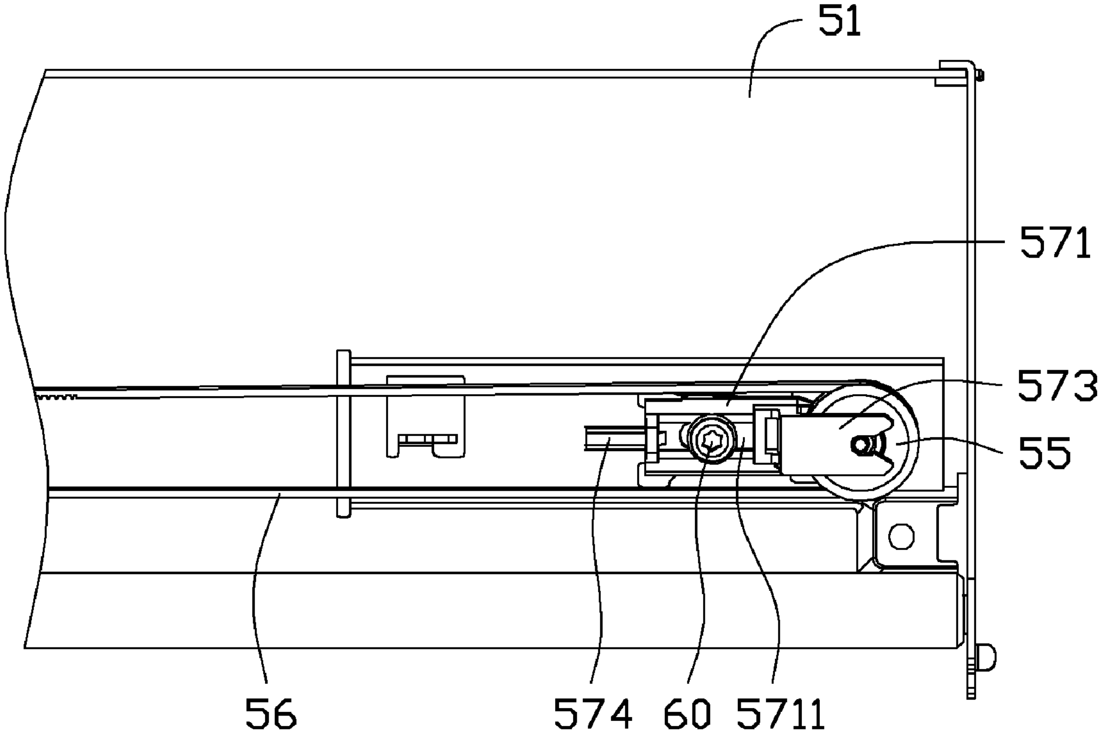
FIG. 9 is a front view of the printing apparatus of FIG. 1, but the adjusting device is not shown.

The adjusting device is slidable relative to the mounting plate 51 between a first position and a second position. In the first position (shown in FIG. 7), the resilient member 40 is in an original state, the indicating block 33 is away from the second wheel 55 and is not at a predetermined/preferred mark, wherein the predetermined/preferred mark is one of the plurality of graduations 255. In the second position as shown in FIG. 8, the resilient member 40 is deformed, and the indicating portion 331 indicates, i.e., is leveled with, a predetermined or preferred mark.

The driving member 30 is pushed in a first direction substantially parallel to the mounting plate 51 towards the second wheel 55. The resilient member 40 is deformed, and the moveable member 20 slides in the first direction to push the retaining member 57 and the driven member 55 in the first direction. The endless belt 56 is thus extended by the driving member 30. Simultaneously, each of the four sliding blocks 5713 is slid from the guiding portion 5141 to the sliding portion 5143 (shown in FIG. 6), until the adjusting device is located in the second position, and each of the four sliding blocks 5713 is positioned in an end of the sliding portion 5143. The endless belt 56 is at a maximum span, and each of the two securing members 70 abuts the positioning member 10.

The driving member 30 is further pushed in the first direction to deform the resilient member 40, until the indicating portion 331 reaches the predetermined mark in the plurality of graduations 255. The driving post 313 is engaged in the threaded hole 11 to prevent the driving member 30 from moving. The fixing hole 5711 is aligned with the securing hole 512. A mounting member 60 is engaged in the fixing hole 5711 and the securing hole 512. The retaining member 57 is secured to the mounting plate 51.

In use, the clipping post 18 may be disengaged from the clamping hole 511, and the adjusting device can be detached from the print head moving module 50.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A printing apparatus comprising:
- a print head moving module comprising:
  - a mounting plate,
  - a first wheel attached to the mounting plate,
  - a second wheel,
  - an endless belt connecting the first wheel and the second wheel, and
  - a retaining member slidably attached to the mounting plate and is adapted to clamp with the second wheel;
- an adjusting device comprising:
  - a positioning member attached to the mounting plate,
  - a driving member attached to the positioning member, comprising an indicating block,
  - a moveable member slidably attached to the positioning member and abutting the retaining member, wherein the moveable member comprises a receiving portion; the receiving portion comprises a plurality of graduations; the indicating block extends through the positioning member and is received in the receiving portion; and
  - a resilient member received in the receiving portion, and is between the driving member and the moveable member, wherein the driving member drives the moveable member and the retaining member away from the first wheel from a first position to a second position; if the moveable member and the retaining member are in the first position, the resilient member is in an original state, and the indicating block is away from a predetermined one of the plurality of graduations; if the moveable member and the retaining member are in the second position, the resilient member is deformed, and the indicating block is leveled with the predetermined one of the plurality of graduations.

2. The printing apparatus of claim 1, wherein the receiving portion defines a positioning hole, and the resilient member is received in the positioning hole.

3. The printing apparatus of claim 2, wherein the receiving portion further defines a gap communicating with the positioning hole, the indicating block comprises an indicating portion, and the indicating portion is received in the positioning hole and extends through the gap.

4. The printing apparatus of claim 2, wherein the positioning member defines a threaded hole, the driving member comprises a driving post, and the driving post engages with the positioning hole through the threaded hole.

5. The printing apparatus of claim 4, wherein the positioning member further defines an accommodating slot communicating with the threaded hole, and the receiving portion is received in the accommodating slot.

6. The printing apparatus of claim 1, the moveable member further comprises a main body; and the retaining member comprises an abutting portion, wherein the abutting portion abuts the main body.

7. The printing apparatus of claim 6, the positioning member defines a receiving hole; and the moveable member further comprises a securing post extending from the main body, wherein the securing post is slidably received in the receiving hole.

8. The printing apparatus of claim 1, the mounting plate defines a clamping hole; and the positioning member comprises a clipping post engaged in the clamping hole, wherein the clipping post is removable from the clamping hole when the moveable member and the retaining member are in the second position.

9. The printing apparatus of claim 1, the retaining member comprises a fixing plate, and a clamping plate connected to the fixing plate, wherein the second wheel is between the clamping plate and the fixing plate.

10. The printing apparatus of claim 9, the mounting plate defines a securing hole; and the clamping plate defines a fixing hole, wherein the clamping plate is secured to the mounting plate with a mounting member engaged in the securing hole and the fixing hole when the moveable member and the retaining member are in the second position.

* * * * *